United States Patent
Bahng et al.

(10) Patent No.: US 8,976,713 B2
(45) Date of Patent: Mar. 10, 2015

(54) METHOD AND APPARATUS FOR PERFORMING TRANSMISSION AND RECEPTION SIMULTANEOUSLY IN SAME FREQUENCY BAND

(75) Inventors: Seungjae Bahng, Daejeon-si (KR); Hoon Lee, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 220 days.

(21) Appl. No.: 13/564,367

(22) Filed: Aug. 1, 2012

(65) Prior Publication Data

US 2013/0034027 A1 Feb. 7, 2013

(30) Foreign Application Priority Data

Aug. 2, 2011 (KR) .................. 10-2011-0077026
Jun. 28, 2012 (KR) .................. 10-2012-0069742

(51) Int. Cl.

| *H01Q 21/06* | (2006.01) |
|---|---|
| *H01Q 3/00* | (2006.01) |
| *H04B 7/02* | (2006.01) |
| *H04L 27/00* | (2006.01) |
| *H04B 1/38* | (2006.01) |
| *H04M 1/00* | (2006.01) |
| *H04B 7/10* | (2006.01) |
| *H04L 27/233* | (2006.01) |
| *H01Q 3/08* | (2006.01) |

(52) U.S. Cl.
CPC .............. *H04B 7/10* (2013.01); *H04L 27/2332* (2013.01); *H01Q 3/08* (2013.01)
USPC ........... 370/277; 342/361; 343/757; 375/267; 375/324; 455/73; 455/562.1

(58) Field of Classification Search
CPC ............... H04B 1/50; H04B 1/56; H04B 1/44
USPC ........... 342/361; 343/757, 176; 375/267, 324; 455/73, 562.1
See application file for complete search history.

(56) References Cited

U.S. PATENT DOCUMENTS

| 3,742,506 | A | * | 6/1973 | Wilkinson ..................... 370/203 |
|---|---|---|---|---|
| 6,347,234 | B1 | * | 2/2002 | Scherzer ..................... 455/562.1 |
| 6,646,599 | B1 | * | 11/2003 | Apa et al. ........................ 342/361 |
| 2004/0077379 | A1 | * | 4/2004 | Smith et al. ................. 455/562.1 |
| 2006/0114164 | A1 | * | 6/2006 | Iluz et al. ........................ 343/757 |
| 2009/0161797 | A1 | * | 6/2009 | Cowles et al. ................. 375/324 |
| 2009/0197544 | A1 | * | 8/2009 | Petersson et al. ............... 455/73 |
| 2010/0067605 | A1 | * | 3/2010 | Jongren ........................ 375/267 |
| 2013/0156125 | A1 | * | 6/2013 | Ko et al. ........................ 375/267 |

FOREIGN PATENT DOCUMENTS

| JP | 09-162842 A | 6/1997 |
|---|---|---|
| KR | 10-0244197 B1 | 11/1999 |
| KR | 10-2006-0108343 A | 10/2006 |

* cited by examiner

*Primary Examiner* — Jung Park
*Assistant Examiner* — Chuong M Nguyen
(74) *Attorney, Agent, or Firm* — Rabin & Berdo, P.C.

(57) ABSTRACT

There are provided a method and apparatus for transmitting and receiving signals in the same frequency band at the same time. A signal is received using a dual polarization antenna, the main axis of the polarization of the reception signal is predicted by performing adaptive polarization tracking, and polarization filtering is performed in order to remove interference. A signal is transmitted through a polarization completely orthogonal to the tracked polarization. In accordance with the present invention, in a wireless communication system, signals can be transmitted and received in the same frequency band at the same time.

8 Claims, 5 Drawing Sheets

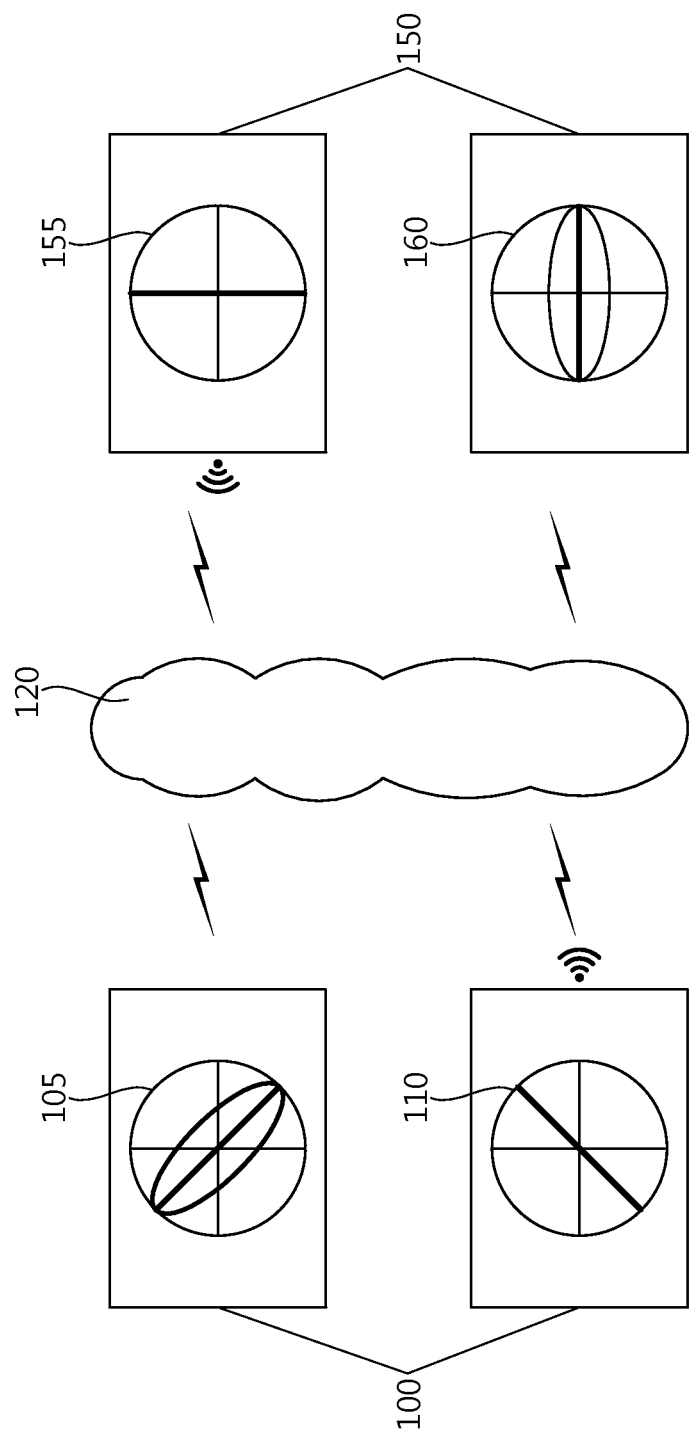

METHOD AND APPARATUS FOR PERFORMING TRANSMISSION AND RECEPTION SIMULTANEOUSLY IN SAME FREQUENCY BAND

This application claims the benefit of priority to Korean patent application number 10-2011-0077026 filed on Aug. 2, 2011 and Korean Patent application number 10-2012-0069742 filed on Jun. 28, 2012 all of which are incorporated by reference in their entirety herein.

BACKGROUND OF THE INVENTION

1. Field of the Invention

The present invention relates to a method and apparatus for performing the transmission and reception of signals simultaneously in the same frequency band and, more particularly, to the polarization tracking of a reception signal using an adaptive polarization tracking function and the transmission of a transmission signal using completely orthogonal polarization.

2. Discussion of the Related Art

In a wireless communication system, there are a method of transmitting and receiving signals through different frequencies for transmission and reception (i.e., Frequency Division Duplex (FDD)) and a method of performing transmission and reception alternately with a time lag (i.e., Time Division Duplex (TDD)).

The reason why simultaneous transmission and reception are impossible in the same frequency band lies in that a reception signal may be buried in a transmission signal because the transmission signal is relatively stronger than the reception signal (e.g., several millions of times). If signals can be simultaneously transmitted and received in the same frequency band by overcoming the problem, frequency efficiency can be doubled.

Meanwhile, electromagnetic field polarization resources are wireless resources that may be used independently from the frequency, time, and space resources. Lots of researches are recently being attempted to use electromagnetic field polarization in wireless communication.

Accordingly, there is a need for a method of improving the transfer rate by utilizing electromagnetic field polarization so that simultaneous transmission and reception can be performed in the same frequency band.

SUMMARY OF THE INVENTION

An object of the present invention is to improve frequency efficiency through the simultaneous transmission and reception of signals in the same frequency band.

An aspect of the present invention relates to a method of transmitting and receiving signals, including receiving a signal using a dual polarization antenna, tracking the main axis of a polarization of the reception signal by performing an adaptive polarization tracking function of tracking the main axis of the polarization of the reception signal and performing polarization filtering for removing an interference signal of the reception signal, and generating a polarization orthogonal to the main axis of the polarization of the reception signal and sending a signal through the generated polarization.

Another aspect of the present invention relates to an apparatus for transmitting and receiving signals, including a reception unit for receiving a signal using a dual polarization antenna and performing polarization filtering, a control unit for performing adaptive polarization tracking on the reception signal, providing the main axis of a polarization of the reception signal to the reception unit, and providing a polarization orthogonal to the main axis of the polarization of the reception signal to a transmission unit, and a transmission unit for sending a signal based on the polarization received from the control unit.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 1b is a diagram showing an example in which two communication devices perform communication simultaneously through a radio channel having the same frequency band by using dual polarization antennas for separated transmission and reception;

DETAILED DESCRIPTION OF THE EMBODIMENTS

Figure 1A:
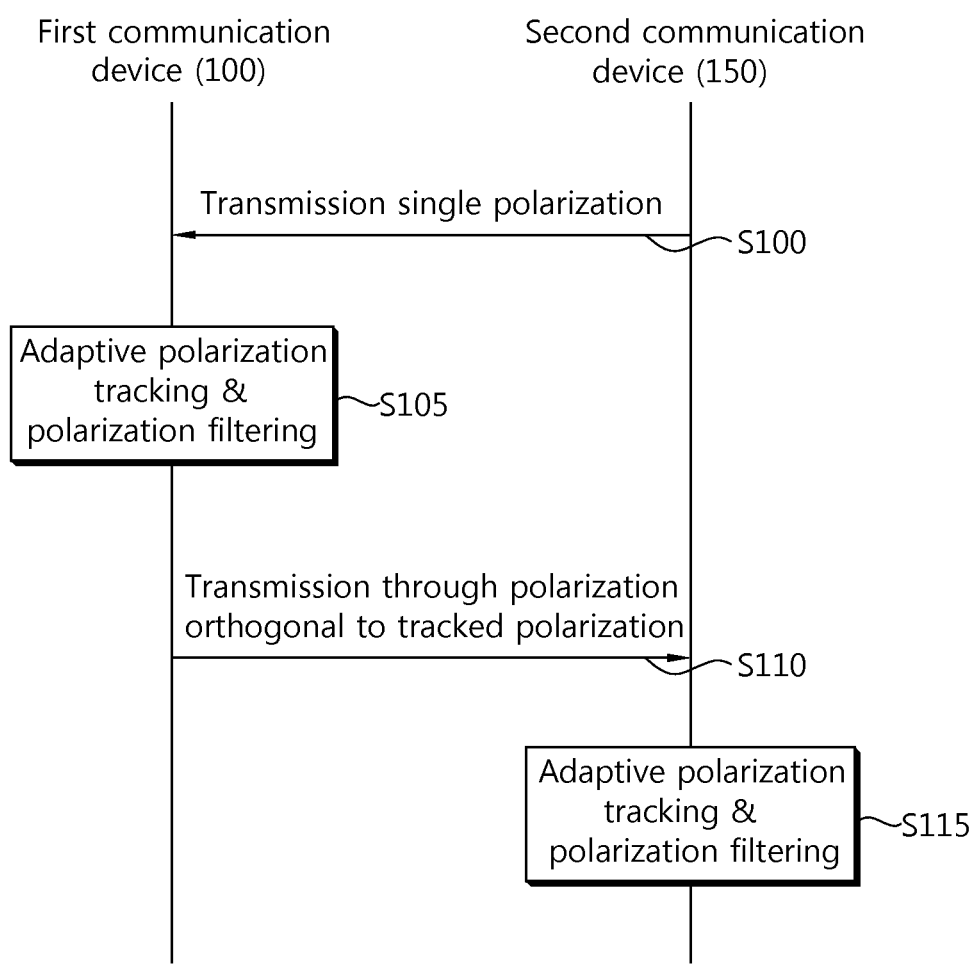
FIG. 1a is a diagram showing an example in which a first communication device and a second communication device perform communication simultaneously through a radio channel having the same frequency band by using dual polarization antennas in the transmission and reception of signals.

Hereinafter, some embodiments of the present invention are described in detail with reference to the accompanying drawings in order for those skilled in the art to be able to readily implement the invention. It is to be noted the present invention is not limited to the following embodiments and may be embodied in various forms. Furthermore, parts not related to the present invention are omitted in order to clarify the present invention in the drawings, and the same or similar reference numerals are used to denote the same or similar functions throughout the drawings.

Polarization means the polarity direction of an electric field to a direction where electromagnetic waves travel. Each antenna has a unique polarization form, and transmission and reception antennas need to have the same polarization direction. If the polarization directions of the transmission and reception antennas are deviated from each other, transmission and reception performance is deteriorated. In the worst case, communication is impossible if a transmission terminal and a reception terminal have completely orthogonal polarization.

If a dual polarization transmission antenna including vertical and horizontal antennas is used, polarizations having various forms may be generated by controlling the amounts and phases of signals transmitted to the respective vertical and horizontal antennas. In contrast, a reception terminal may simulate polarizations having various forms by applying different weights to vertical and horizontal antennas using a dual polarization reception antenna. Consequently, a transmission terminal and a reception terminal may control transmission and reception polarizations by using dual polarization antennas.

FIGS. 1a and 1b are diagrams showing an example in which a first communication device 100 and a second communication device 150 transmit and receive signals at the same time in the same frequency band through a radio channel 120 by using dual polarization transmission and reception antennas.

Each of the first communication device 100 and the second communication device 150 includes at least one dual polarization transmission and reception antenna.

Each of the first communication device 100 and the second communication device 150 may be user equipment, such as a smart phone, a relay, or a base station, and it may be applied to devices for performing communications of various forms (e.g., wireless mobile communication and in-device communication).

Referring to FIGS. 1a and 1b, the second communication device 150 generates a single polarization by using a dual polarization transmission antenna 155 and then sends a signal to the first communication device 100 through the generated single polarization at step S100. The signal of the second communication device 150 passes through the radio channel 120, and the signal having a specific distribution is received by the dual polarization reception antenna 105 of the first communication device 100.

The first communication device 100 tracks the main axis of the polarization of the signal received from the second communication device 150 by performing an adaptive polarization tracking function and performs polarization filtering on the signal at step S105.

The adaptive polarization tracking function of tracking the main axis of the polarization of the reception signal refers to a function of predicting a polarization component from which the greatest energy can be extracted, from among signals received with a specific distribution.

Polarization filtering refers to a function of removing an interference signal, not wanted by a receiver, from the main axis component predicted through adaptive polarization tracking.

The first communication device 100 generates a polarization that completely orthogonal to the tracked main axis of the reception polarization by using the dual polarization transmission antenna and sends a signal to the second communication device 150 through the generated polarization at step S110.

The second communication device 150 receives the signal from the first communication device 100 by using a dual polarization reception antenna 160 and performs adaptive polarization tracking and polarization filtering on the received signal at step S115.

The main axis of the polarization of the reception signal that has been predicted by the adaptive polarization tracking of the second communication device 150 will be orthogonal to the polarization used for the transmission of the signal by a dual polarization transmission antenna 155 according to the duality of a channel. The polarization that is completely orthogonal to the main axis of the polarization of the reception signal predicted by the second communication device 150 is used for the transmission of the second communication device 150.

Power of each of the transmission signals of the first and the second communication devices is several millions of times greater than power of each of the reception signals of the first and the second communication devices, but it does not influence the reception signal because the polarization of the transmission signal is orthogonal to the polarization of the reception signal.

Accordingly, signals can be transmitted and received in the same frequency band at the same time.

Figure 2A:
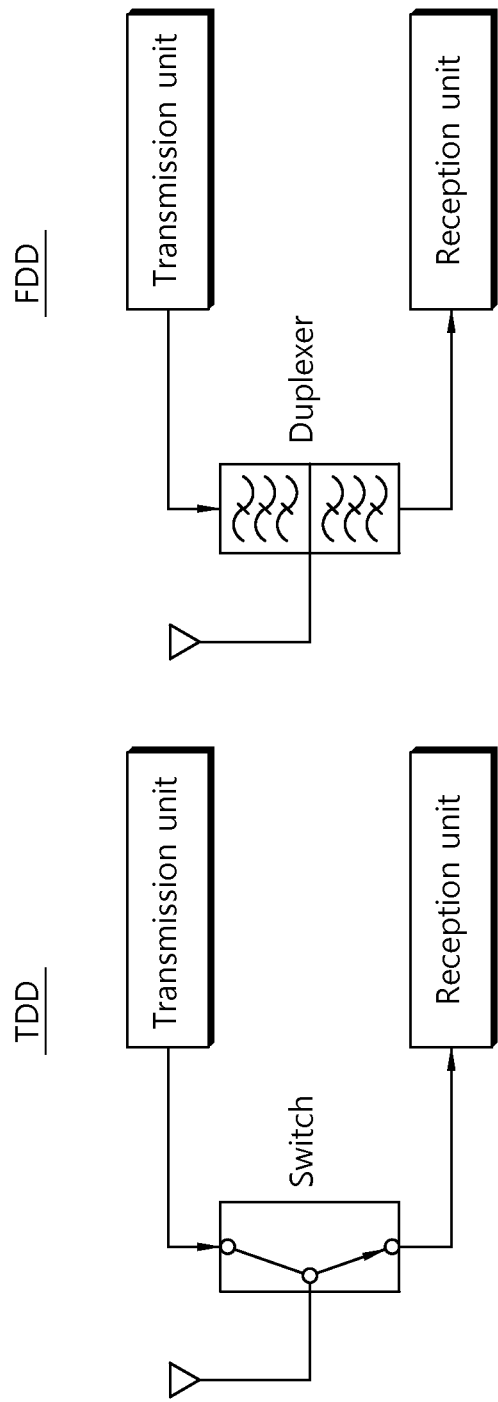
FIG. 2a and FIG. 2b is an example of a system on which one dual polarization antenna for transmission and reception is mounted through control of transmission and reception polarizations in the baseband of the present invention along with the existing TDD and FDD systems.
Figure 2B:
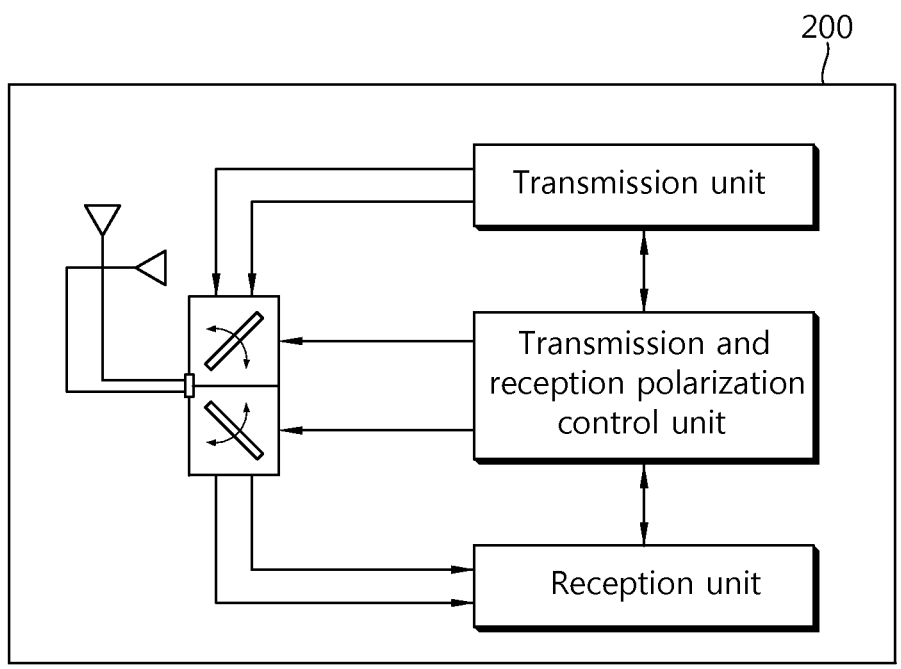

FIG. 2a and FIG. 2b are an example of a system on which one dual polarization antenna for transmission and reception is mounted through control of transmission and reception polarizations in the baseband of the present invention along with the existing TDD and FDD systems.

Referring to FIG. 2a, in the TDD system, only a transmission unit and a reception unit are selected by a switch, and signals are transmitted and received. In the FDD system, only a transmission unit and a reception unit are selected by a duplexer, and signals are transmitted and received.

Referring to FIG. 2b, in accordance with the communication system 200 of the present invention, a transmission unit and a reception unit are controlled by a transmission and reception polarization control unit. The transmission and reception polarization control unit predicts the main axis of a reception antenna from which the greatest energy of a reception signal polarization can be extracted by using an adaptive polarization tracking function and performs control by transferring relevant information to the reception unit and the transmission unit so that signals can be transmitted and received.

Figure 3:
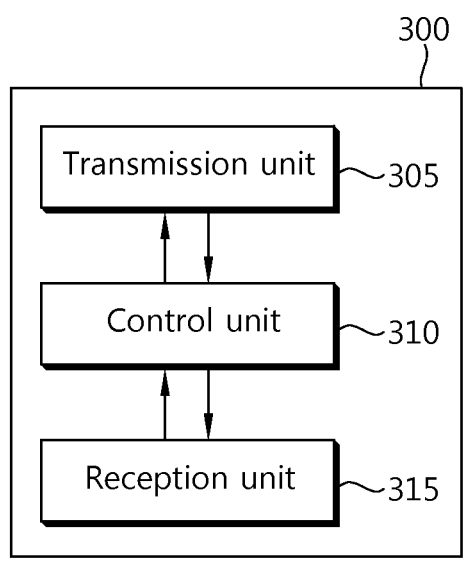
FIG. 3 is a block diagram showing a communication device for performing transmission and reception in the same frequency band at the same time by using a dual polarization antenna.

FIG. 3 is a block diagram showing a communication device for performing transmission and reception in the same frequency band at the same time by using a dual polarization antenna. Here, the dual polarization antenna refers to an antenna that is able to generate and receive polarizations having various forms by controlling the amount and phase of each of signals transmitted to respective vertical and horizontal antennas.

Referring to FIG. 3, the communication device 300 may include at least one of a transmission unit 305, a control unit 310, and a reception unit 315.

The reception unit 315 receives a signal, transmitted by another communication device using a single polarization, by using a dual polarization antenna. The reception signal passing through a polarization radio channel may have a specific distribution. Polarization filtering may be performed in order to remove interference, if necessary.

The control unit 310 predicts the main axis of the reception signal from which the greatest energy of the reception signal polarization can be extracted by using an adaptive polarization tracking function and transfers relevant information to the reception unit 315 and the transmission unit 305.

The transmission unit 305 sends a signal to another communication device by using a polarization orthogonal to the tracked polarization.

Here, the transmission unit 305 and the reception unit 315 can send and receive the signals in the same frequency band at the same time. The transmission signal does not influence the reception signal because the polarization of the transmission signal is completely orthogonal to the polarization of the reception signal.

In accordance with the present invention, in a wireless communication system, signals can be transmitted and received in the same frequency band at the same time.

In the above exemplary systems, although the methods have been described on the basis of the flowcharts using a series of the steps or blocks, the present invention is not limited to the sequence of the steps, and some of the steps may be performed in order different from that of the remaining steps or may be performed simultaneously with the remaining steps. Furthermore, those skilled in the art will understand that the steps shown in the flowcharts are not exclusive and they may include other steps or one or more steps of the flowchart may be deleted without affecting the scope of the present invention.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. A method of transmitting and receiving signals, comprising:
  receiving a signal using a dual polarization antenna;
  tracking a main axis of a polarization of the reception signal by performing an adaptive polarization tracking function which tracks the main axis of the polarization of the reception signal and performing polarization filtering for removing an interference signal of the reception signal; and
  generating a polarization orthogonal to the main axis of the polarization of the reception signal and sending a signal through the generated polarization;
  wherein the receiving of the signal and the sending of the signal are performed in a same frequency band at a same time.

2. The method as claimed in claim 1, wherein the reception of the signal is performed through at least one dual polarization antenna.

3. The method as claimed in claim 1, wherein the transmission of the signal is performed through at least one dual polarization antenna.

4. The method as claimed in claim 1, wherein an apparatus for transmitting or receiving the signal is user equipment, a relay, or a base station.

5. An apparatus for transmitting and receiving signals, comprising:
  a reception unit for receiving a signal using a dual polarization antenna and performing polarization filtering;
  a control unit for performing adaptive polarization tracking on the reception signal, providing a main axis of a polarization of the reception signal to the reception unit, and providing a polarization orthogonal to the main axis of the polarization of the reception signal to a transmission unit; and
  a transmission unit for sending a signal based on the polarization received from the control unit;
  wherein the reception unit and the transmission unit receive and send respective signals in a same frequency band at a same time.

6. The apparatus as claimed in claim 5, wherein the reception unit comprises at least one dual polarization antenna.

7. The apparatus as claimed in claim 5, wherein the transmission unit comprises at least one dual polarization antenna.

8. The apparatus as claimed in claim 5, wherein the apparatus is included in user equipment, a relay, or a base station.

* * * * *